United States Patent [19]

Nishimura et al.

[11] Patent Number: 4,930,895
[45] Date of Patent: Jun. 5, 1990

[54] ENCODER FOR FORMING INTERFERENCE FRINGES BY RE-DIFFRACTED LIGHTS FROM AN OPTICAL TYPE SCALE AND PHOTOELECTRICALLY CONVERTING THE INTERFERENCE FRINGES TO THEREBY DETECT THE DISPLACEMENT OF THE SCALE

[75] Inventors: Tetsuharu Nishimura, Kawasaki; Masaaki Tsukiji; Satoshi Ishii, both of Tokyo; Koh Ishizuka, Urawa, all of Japan

[73] Assignee: Canon Kabushiki Kaisha, Tokyo, Japan

[21] Appl. No.: 204,727

[22] Filed: Jun. 10, 1988

[30] Foreign Application Priority Data

Jun. 15, 1987 [JP] Japan .................... 62-148207

[51] Int. Cl.$^5$ ............................. G01B 9/02
[52] U.S. Cl. ............................. 356/356
[58] Field of Search .................. 356/355, 356; 250/237 G

[56] References Cited

U.S. PATENT DOCUMENTS

| | | |
|---|---|---|
| 3,726,595 | 4/1973 | Matsumoto . |
| 3,738,753 | 6/1973 | Huntley, Jr. . |
| 3,756,723 | 9/1973 | Hock . |
| 3,891,321 | 6/1975 | Hock . |
| 4,629,886 | 12/1986 | Akiyama et al. . |
| 4,676,645 | 6/1987 | Taniguchi et al. .......... 356/356 |

FOREIGN PATENT DOCUMENTS

| | | |
|---|---|---|
| 1169150 | 4/1964 | Fed. Rep. of Germany . |
| 58-191906 | 11/1983 | Japan . |
| 58-191907 | 11/1983 | Japan . |
| 60-190812 | 9/1985 | Japan . |
| 61-65165 | 4/1986 | Japan . |
| 61-178613 | 8/1986 | Japan . |
| 61-212728 | 9/1986 | Japan . |
| 62-6119 | 1/1987 | Japan . |
| 62-12814 | 1/1987 | Japan . |
| 906101 | 9/1962 | United Kingdom . |
| 997405 | 7/1965 | United Kingdom . |
| 1282048 | 7/1972 | United Kingdom . |

Primary Examiner—Davis L. Willis
Assistant Examiner—Matthew W. Koren
Attorney, Agent, or Firm—Fitzpatrick, Cella, Harper & Scinto

[57] ABSTRACT

An optical type encoder for projecting a light beam onto an optical type scale having a diffraction grating formed thereon, forming interference fringes by the use of the diffracted light from the scale, and photoelectrically converting such interference fringes to thereby detect the displacement of the scale. The first and second light beams are caused to obliquely enter substantially the same position on the scale from different first and second directions, first and second diffracted light beams emerging perpendicularly from the scale by the light beams being diffracted by the scale are received by a common reflecting element, the first and second diffracted light beams are directed to said position by the reflecting element, and interference fringes formed by diffracted light beams emerging from the scale in the first and second directions by the first and second diffracted light beams being diffracted by the scale are photoelectrically converted.

34 Claims, 2 Drawing Sheets

ENCODER FOR FORMING INTERFERENCE FRINGES BY RE-DIFFRACTED LIGHTS FROM AN OPTICAL TYPE SCALE AND PHOTOELECTRICALLY CONVERTING THE INTERFERENCE FRINGES TO THEREBY DETECT THE DISPLACEMENT OF THE SCALE

BACKGROUND OF THE INVENTION

1. Field of the Invention

This invention relates to an optical type encoder, and in particular to an encoder for forming interference fringes by diffracted lights from an optical type scale having a diffraction grating on which divisions are formed, and photoelectrically converting the interference fringes to thereby detect the displacement of the scale.

2. Related Beckground Art

In recent years, in precision machines such as NC machine tools and semiconductor printing apparatuses, there have been required precise displacement measuring apparatuses which can measure the displacement of a moving member such as a stage at the unit of 1 μm or less (submicron). As measuring apparatuses which can measure displacement and amount of rotation at the unit of submicron, there are well known rotary encoders and linear encoders in which a coherent light beam such as a laser is used and interference fringes are formed by diffracted lights from an optical type scale mounted on a moving object and the interference fringes are photoelectrically converted to thereby measure the displacement of the scale.

Optical type encoders of this kind are numerously shown, for example, in U.S. Pat. Nos. 3,726,595, 3,738,753, 3,756,723, 3,891,321, 4,629,886, 4,676,645, Japanese Laid-Open Patent Applications Nos. 58-191906, 58-191907, 60-190812, 61-65165, 61-178613, 61-212728, 62-6119, and 62-12814.

Some of these prior-art optical type encoders are of the type in which a laser beam is projected onto an optical type scale having a diffraction grating formed thereon, diffracted light produced by the optical type scale is again directed to the optical type scale by reflecting mirrors and re-diffracted light produced by the optical type scale are utilized to form interference fringes. A signal obtained by photoelectrically converting the interference fringes thus provided by the re-diffracted lights is twice the signal obtained by photoelectrically converting the interference fringes provided by diffracted light obtained by one diffraction. Accordingly, the displacement of the moving member to be measured (the optical type scale) can be detected with double the resolving power.

However, whereas in the prior art, individual reflecting mirrors are provided for respective ones of the two diffracted lights produced in the optical type encoder and the respective diffracted lights are returned to the optical type encoder by these reflecting mirrors, a use of the plurality of reflecting mirrors has prevented the apparatus from being made compact. Also, when the components of the apparatus are all provided on the same side with respect to the optical type scale in order to increase the versatility of the encoder, the prior-art optical type encoders have become complex in construction.

SUMMARY OF THE INVENTION

It is an object of the present invention to provide an optical type encoder which is simple in construction and which can readily be made compact.

To achieve the above object, the optical type encoder of the present invention is an optical type encoder for projecting a light beam onto an optical type scale having a diffraction grating formed thereon, forming interference fringes by the use of the diffracted lights from the scale, and photoelectrically converting such interference fringes to thereby measure the displacement of the scale, characterized in that first and second light beams are caused to obliquely enter substantially the same position on the scale from different first and second directions, first and second diffracted light beams emerging perpendicularly from the scale by the light beams being diffracted by the scale are received by a common reflecting element, the first and second diffracted light beams are directed to said position by the reflecting element, and diffracted light beams emerging from the scale in the first and second directions by said first and second diffracted light beams being diffracted by the scale are caused to overlap each other to thereby form interference fringes.

Further features and specific forms of the present invention will hereinafter be described in detail.

DESCRIPTION OF THE PREFERRED EMBODIMENTS

Figure 1:
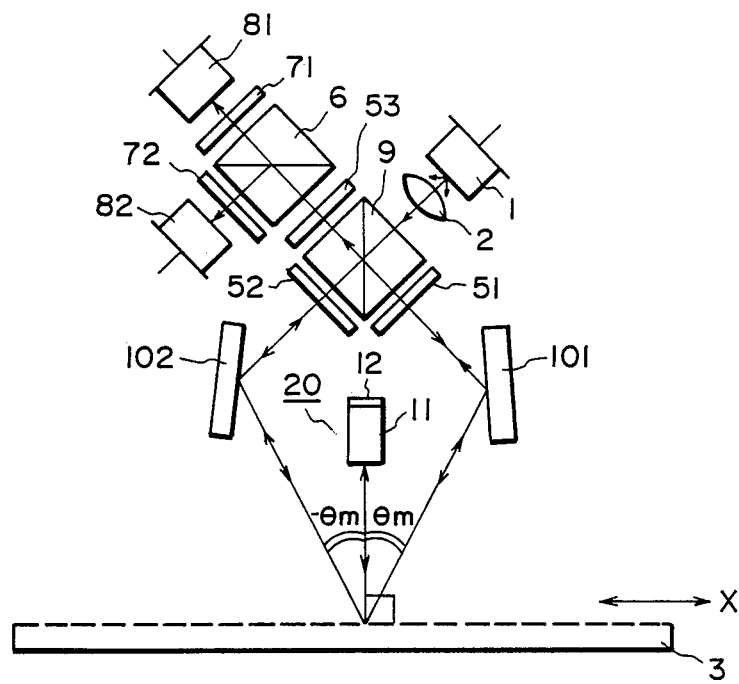
FIG. 1 is a schematic diagram of an optical system showing an embodiment of the optical type encoder of the present invention.

FIG. 1 is a schematic diagram of an optical system showing an embodiment of the optical type encoder of the present invention.

In FIG. 1, the reference numeral 1 designates a semiconductor laser, the reference numeral 2 denotes a collimator lens, and the reference numeral 3 designates an optical type scale having a diffraction grating of grating pitch d mounted on a moving object to be measured, not shown, and moving in the direction of arrow X at a velocity v. The reference numeral 9 denotes a polarizing beam splitter, the reference numerals 51 and 52 designate quarter wavelength plates, the reference numerals 101 and 102 denote reflecting mirrors, the reference numeral 6 designates a beam splitter, and the reference numerals 71 and 72 denote polarizing plates whose polarization axes are orthogonal to each other and disposed so as to form an angle of 45° with the polarization axes of the quarter wavelength plates 51 and 52. The reference numerals 81 and 82 designate light-receiving elements which photoelectrically convert interference fringes. The reference numeral 11 denotes an index distribution type stick-like lens with planar opposite ends for imaging light incident from one end surface on the other end surface, and a reflecting film 12 is applied to one end thereof. The lens 11 and the reflecting film 12 together constitute a reflecting element 20.

In the present embodiment, a coherent light beam from the semiconductor laser 1 is substantially collimated by the collimator lens 2 and is caused to enter the polarizing beam splitter 9, whereby it is divided into two light beams, i.e., a transmitted light beam which is linearly polarized (P-polarized light) and a reflected light beam which is linearly polarized (S-polarized light). The mounted position of the semiconductor laser 1 is adjusted so that at this time, the direction of linear polarization of the emergent light beam from the semiconductor laser 1 is 45° with respect to the direction of polarization of the polarizing beam splitter 9. As result, the intensity ratio between the transmitted light beam and the reflected light beam from the polarizing beam splitter 9 is about 1:1.

The reflected light beam and the transmitted light beam from the polarizing beam splitter 9 are made into circularly polarized lights through the quarter wavelength plates 51 and 52, respectively, are reflected by the reflecting mirrors 101 and 102 and are caused to obliquely enter the optical type scale 3. Each light beam is caused to enter the optical type scale 3 so that the mth-order diffracted light from the optical type scale 3 emerges substantially perpendicularly from the diffraction grating surface of the optical type scale 3.

That is, each light beam is caused to enter the optical type scale 3 so that $$\theta m \approx \sin^{-1}(m\lambda/P), \quad (1)$$

where P is the grating pitch of the diffraction grating of the optical type scale 3, $\lambda$ is the wavelength of the coherent light beam from the semiconductor laser 1, m is an integer, and $\theta m$ is the angle of incidence of the coherent light beam onto the diffraction grating surface (the angle from the perpendicular to the diffraction grating surface).

The reflected light beam from the polarizing beam splitter 9 obliquely enters the optical type scale 3 at the angle of incidence $\theta m$, and is reflected and diffracted by the diffraction grating of the optical type scale 3, and the 1st-order diffracted light emerges perpendicularly from the optical type scale 3. On the other hand, the transmitted light beam from the polarizing beam splitter 9 obliquely enters the optical type scale 3 at the angle of incidence $-\theta m$, and is reflected and diffracted by the diffraction grating of the optical type scale 3, and the 1st-order diffracted light emerges perpendicularly from the optical type scale 3. In the present embodiment, the positions of incidence of the reflected light beam and the transmitted light beam onto the optical type scale 3 are the same, and a pair of ($\pm$1st-order) diffracted lights emerging perpendicularly from the optical type scale 3 overlap each other. Thus, these reflected and diffracted lights form a common optical path. The optical paths of the transmitted light beam and the reflected light from the polarizing beam splitter 9 and of the reflected and diffracted lights are contained in the same incidence plane (a plane parallel to the plane of the drawing sheet).

Figure 2:
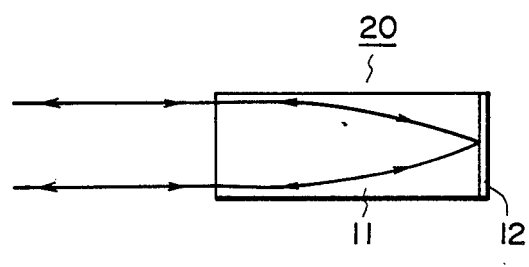
FIG. 2 illustrates the action of a reflecting element shown in FIG. 1.

The $\pm$1st-order diffracted lights which emerge perpendicularly from the optical type scale 3 travel toward the reflecting element 20 and enter the end surface of the lens 11. The lens 11, which is a stick-like lens, has its length set so that a parallel light having entered one end surface thereof is imaged on the other end surface. That is, the focal plane of the element 20 is on the end surface of the element. The reflecting film 12 is formed on said other end surface. Accordingly, the mth-order diffracted light having emerged substantially perpendicularly from the optical type scale 3 is caused to enter the lens 11. Since the reflecting film 12 is provided near the focal plane of the lens 11, the light is reflected by the reflecting film 12 as shown in FIG. 2, whereafter it returns along the original optical path, emerges from the lens 11 and enters the optical type scale 3.

The $\pm$1st-order reflected and diffracted lights again diffracted by the diffraction grating of the optical type scale 3 return along the original optical path, are reflected by the reflecting mirrors 101 and 102, are transmitted through the quarter wavelength plates 51 and 52 and again enter the polarizing beam splitter 9.

At this time, the re-diffracted lights pass again through the quarter wavelength plates 51 and 52 and therefore, the (S-polarized) light beam reflected at first by the polarizing beam splitter 9, when re-entering the polarizing beam splitter, becomes P-polarized light whose direction of polarization relative to the polarizing beam splitter 9 differs by 90°, and thus, it is transmitted through the polarizing beam splitter 9. Conversely, the (P-polarized) light beam transmitted at first through the polarizing beam splitter 9 becomes S-polarized light and is reflected by the polarizing beam splitter 9 when it re-enters the polarizing beam splitter.

Thus, the two re-diffracted lights are caused to overlap each other by the polarizing beam splitter 9, and are made into circularly polarized lights opposite in direction to each other through the quarter wavelength plate 53 and are divided into two light beams by the beam splitter 6, and are made into linearly polarized lights through the polarizing plates 71 and 72, respectively, whereafter they are caused to enter the light-receiving elements 81 and 82, respectively.

The angle of incidence $\theta m$ in formula (1) may be of a value within the range over which the diffracted light can enter the reflecting element 20 and again enter the optical type scale 3.

In the present embodiment, the phase of the mth-order diffracted light varies by $2m\pi$ when the diffraction grating moves by one pitch. Accordingly, the light-receiving elements 81 and 82 receive the interference fringes caused between the light beams which have undergone positive and negative mth-order diffractions twice each and photoelectrically convert them and therefore, when the diffraction grating moves by an amount corresponding to one pitch of the grating, there are obtained 4 m sine wave signals.

Accordingly, the pitch of the diffraction grating of the optical type scale 3 is 3.2 $\mu$m and 1st-order (m=1) is utilized as the diffracted light and therefore, when the optical type scale 3 moves by 3.2 $\mu$m, there are obtained four sine wave signals from the light-receiving elements 81 and 82. That is, $\frac{1}{4}$ of the pitch of the diffraction grating, i.e., 3.2/4=0.8 $\mu$m, is obtained as the resolving power per sine wave.

Also, a phase difference of 90° is provided between the output signals from the light-receiving elements 81 and 82 by a combination of the quarter wavelength plates 51, 52, 53 and the polarizing plates 71, 72 so that the direction of movement of the diffraction grating can be discriminated. If only the amount of movement is to be measured, a single light-receiving element will suffice and the quarter wavelength plate 53 and the beam splitter 6 will be unnecessary.

The optical type scale 3 used in the present invention can be constructed of an amplitude type or phase type diffraction grating, and the phase type diffraction grating may be of the relief type or a hologram element or the like.

In the present embodiment, the optical paths of the ±1st-order diffracted lights emerging from the optical type scale 3 are made common and these diffracted lights are again directed to the optical type scale 3 through the common reflecting element 20. That is, individual reflecting mirrors need not be provided for individual diffracted lights and therefore, the apparatus can be constructed compactly and simply. Also, thereby, the rate at which stray lights are created and reach the light-receiving elements is decreased to improve the detection accuracy of interference fringes.

Further, as shown in FIG. 1, all the parts constituting the apparatus can readily be provided above (on one side) of the optical type scale 3 and thus, an optical type encoder very rich in versatility is provided.

The reflecting element 20 in the present embodiment has its reflecting surface near the focal plane and therefore, even if for example, the angle of diffraction resulting from the oscillation wavelength of the laser beam varies minutely to thereby vary more or less the angle of incidence onto the lens 11, the diffracted lights can be returned to the optical type scale 3 along substantially the same optical path. Thereby, the two positive and negative diffracted lights are caused to overlap each other accurately, with a result that a reduction in the S/N ratio of the output signals of the light-receiving elements 81 and 82 is prevented. Also, by the angle of incidence $\theta m$ of the coherent light beam onto the optical type scale 3 being set as previously described and by the reflecting element 20 being used, compactness of the entire apparatus is achieved.

Accordingly, if the grating pitch of the diffraction grating of the optical type scale 3 is 3.2 $\mu$m and the wavelength of the laser 1 is 0.78$\mu$, the angle of diffraction of the ±1st-order diffracted lights is 14.2° as previously mentioned. So, where an index distribution type lens having a diameter of the order of 2 mm is used as the lens 11 to reflect only ±1st-order diffracted lights, the distance from the optical type scale 3 to the lens 11 is 2/tan 14.2°=7.9 mm, and the two can be spaced apart from each other by the order of 8 mm and thus, the entire apparatus can be constructed very compactly.

In the present embodiment, the optical path lengths of a pair of re-diffracted lights forming interference fringes on the light-receiving elements 81 and 82 are equal to each other. Accordingly, even if the wavelength of the semiconductor laser 1 varies, interference fringes reacting to only the displacement of the optical type scale 3 can be formed. Also, an inexpensive multi-mode semiconductor laser can be carried as a light-emitting element on the apparatus.

In the present embodiment, as will be seen from FIG. 1, the optical path by the optical system comprising the polarizing beam splitter 9, the reflecting mirrors 101, 102 and the reflecting element 11 is bisymmetrical and constitutes a system insensitive to a disturbance such as vertical movement of the optical type scale 3.

Figure 3:
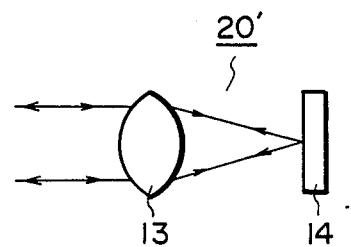
FIG. 3 is a schematic view showning another example of the reflecting element.

Also, in the present embodiment, an index distribution type lens is used as the lens 11, but as shown in FIG. 3, the reflecting element 20 may be constituted by a combination of a condensing lens 13 and a reflecting mirror 14.

Figure 4:
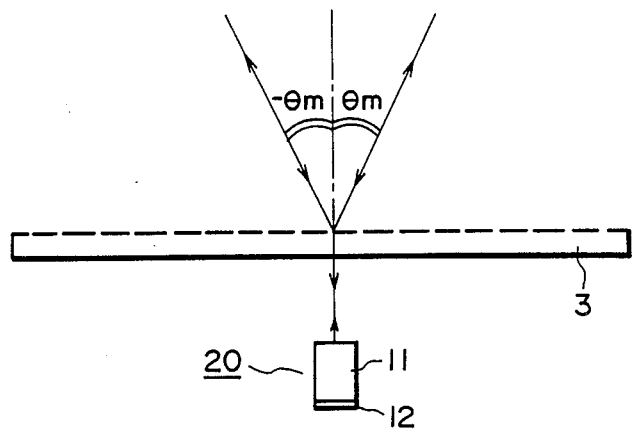
FIG. 4 is a partial schematic diagram showing a modification of the optical system shown in FIG. 1.

Also, in the present embodiment, the reflected and diffracted light is again directed to the optical type scale 3, but as shown in FIG. 4, the reflecting element 20 may be disposed on the other side of the optical type scale 3 to direct the transmitted and diffracted light again to the optical type scale 3.

Figure 5:
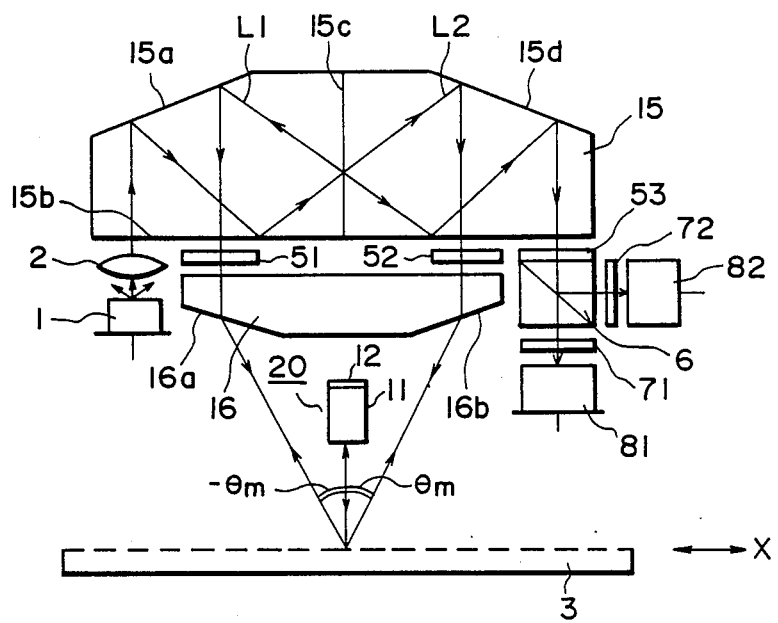
FIG. 5 is a specific construction diagram showing another embodiment of the optical type encoder of the present invention.

FIG. 5 shows another embodiment of the present invention. In FIG. 5, elements identical to those in FIG. 1 are given identical reference numerals. In FIG. 5, the reference numeral 15 designates a polarizing prism having the same function as that of the polarizing beam splitter 9 in the embodiment of FIG. 1. The reference numeral 16 denotes a turn-back prism having the same function as that of the system comprising the reflecting mirrors 101 and 102 in the embodiment of FIG. 1.

The polarizing prism 15 is such that the portion thereof which receives the light beam from the collimator lens 2 and the portion thereof from which the light beam travelling toward the quarter wavelength plates 51 and 52 emerges are light-transmitting portions, and reflecting films are provided on the lower surface 15b and the upper inclined surfaces 15a and 15d of the prism 15. The surfaces 15a, 15b and 15d will hereinafter be referred to as the reflecting surfaces. Designated by 15c is a polarizing beam dividing surface.

The turn-back prism 16 is a prism similar in shape to the polarizing prism 15, and it refracts a light beam by a predetermined angle by two inclined surfaces 16a and 16b formed in the lower portion of the prism, and this refracted light beam is directed to the optical type scale 3.

In the present embodiment, the light beam from the semiconductor laser 1 is collimated by the collimator lens 2 and is caused to enter the polarizing prism 15. The light beam caused to enter the polarizing prism 15 is reflected by the reflecting surfaces 15a and 15b, whereafter it is divided by the polarizing beam dividing surface 15c into two light beams, i.e., a reflected light beam L1 which is S-polarized and a transmitted light beam L2 which is P-polarized. The reflected light beam L1 and the transmitted light beam L2 are reflected by the reflecting surfaces 15a and 15d, respectively, and emerge from the light-transmitting portion of the surface 15b and are transmitted through the quarter wavelength plates 51 and 52, whereafter they are refracted by a predetermined angle by the turn-back prism 16, and are caused to enter the diffraction grating of the optical type scale 3 in such a manner as to satisfy the condition of the aforementioned formula (1).

Predetermined orders of diffracted lights diffracted by the optical type scale 3 are caused to enter the optical type scale 3 again through the reflecting element 20, and the two re-diffracted lights from the optical type scale 3 are caused to overlap each other through the prism 16 and the polarizing prism 15, whereafter the overlapping light is transmitted through the quarter wavelength plate 53 as in the embodiment of FIG. 1 and is divided into two light beams by the beam splitter 6 and the two light beams are passed through the polarizing plates 71 and 72, respectively, and thereafter are received by the light-receiving elements 81 and 82, respectively. The amount of displacement and the direction of movement of the optical type scale 3 are detected on the basis of signals obtained by photoelectrically converting the interference fringes formed on the light-receiving elements 81 and 82.

In the present embodiment, the turn-back prism 16 is disposed in the optical paths of a pair of light beams, and the light beams are refracted by the inclined surfaces of the prism 16, and the respective light beams are caused to obliquely enter the optical type scale at a predetermined angle of incidence $\pm\theta m$. Accordingly, a single optical member is only installed instead of the reflecting mirrors 101 and 102 used in the optical system shown in FIG. 1 and therefore, the construction becomes simpler.

Also, the present embodiment can exhibit an operational effect equal to that of the optical type encoder shown in FIG. 1.

The optical type encoders shown in FIGS. 1 and 5 are linear encoders for reading a linear optical type scale, but the present invention is also applicable to a rotary encoder for reading a rotary optical type scale. Where the present invention is applied to a rotary encoder, it is preferable that the optical systems shown in FIG. 1 and 5 be installed at a plurality of locations on the rotary optical type scale, particularly, at positions symmetrical with respect to the center of rotation of the optical type scale. By adopting such a construction, the influence which the eccentricity between the center of the optical type scale and the center of rotation thereof has upon the detection accuracy of the amount of displacement (the angle of rotation) can be mitigated.

We claim:

1. An optical type encoder for projecting a light beam onto an optical type scale having a diffraction grating formed thereon, for forming interference light by the use of the light diffracted from the scale, and for photoelectrically converting such interference light to thereby detect the displacement of the scale, wherein said apparatus comprises:
    means for projecting first and second light beams obliquely at substantially the same position onto the scale from different first and second directions;
    a common reflecting system for reflecting system for reflecting first and second diffracted light beams emerging perpendicularly from the scale, wherein said common reflecting system directs the first and second diffracted light beams to perpendicularly enter said same position on the scale to be re-diffracted; and
    means for photoelectrically converting interference light formed by diffracted light beams emerging from said scale in said first and second directions by the first and second diffracted light beams being diffracted by the scale, wherein
    the first diffracted light beam is a positive predetermined-order diffracted light beam and the second diffracted light beam is a negative predetermined-order diffracted light beam, and the first re-diffracted light beam is a positive predetermined-order diffracted light beam produced by diffracting the first diffracted light beam and the second re-diffracted light beam is a negative predetermined-order diffracted light beam produced by diffracting the second diffracted light beam.

2. An optical type encoder comprising:
    a light source emitting a light beam;
    light dividing means for dividing the light beam into first and second light beams;
    an optical system for causing the first and second light beams to obliquely enter substantially the same position on an optical type scale having a diffraction grating from different first and second directions;
    a common reflecting system for reflecting first and second diffracted light beams emerging perpendicularly from said optical type scale and directing them to perpendicularly enter said same position on said optical type scale to be re-diffracted; and
    means for photoelectrically converting interference light formed by the first and second re-diffracted light beams produced by the first and second diffracted light beams being diffracted by said optical type scale, the first and second re-diffracted light beams being superimposed through said optical system and said light dividing means to form an interference light, wherein
    the first diffracted light beam is a positive predetermined-order diffracted light beam and the second diffracted light beam is a negative predetermined-order diffracted light beam, and the first re-diffracted light beam is a positive predetermined-order diffracted light beam produced by diffracting the first diffracted light beam and the second re-diffracted light beam is a negative predetermined-order diffracted light beam produced by diffracting the second diffracted light beam.

3. An encoder according to claim 2, wherein said reflecting system comprises a stick-like index distribution type lens whose opposite ends are planar, and a reflecting film formed on one end surface of said lens.

4. An encoder according to claim 2, wherein the first and second diffracted light beams are light beams reflected and diffracted by the optical type scale, and wherein said reflecting means is provided on the same side as said optical system with respect to the optical type scale.

5. An encoder according to claim 2, wherein the angle of incidence $\theta m$ of the first and second light beams onto the optical type scale satisfies the following condition:

$$\theta m \approx \sin^{-1}(m\lambda/P),$$

where $\lambda$ is the wavelength of said light beams, P is the pitch of the diffraction grating of said scale, and m is an integer.

6. An encoder according to claim 5, wherein the first and second diffracted light beams are 1st-order diffracted light.

7. An encoder according to claim 2, wherein said light source comprises a semiconductor laser, and said light dividing means comprises a polarizing beam splitter, and wherein said encoder further comprises a collimator lens for collimating and directing the light beam from said semiconductor laser to said polarizing beam splitter, and quarter wavelength plates provided in the optical paths of the first and second light beams from said polarizing beam splitter.

8. An encoder according to claim 2, wherein said optical system includes a prism having first and second inclined surfaces formed correspondingly to the first and second light beams, respectively, such that the first light beam is refracted by said first inclined surface and the second light beam is refracted by said second inclined surface.

9. A displacement measuring apparatus comprising:
    irradiating means for causing a plurality of light beams to obliquely enter substantially the same position on a movable diffracting grating from different directions from one another in order to cause a plurality of diffracted lights to emerge perpendicularly from the diffraction grating;

reflecting means for reflecting the plurality of diffracted lights to direct the plurality of diffracted lights to said same position on the diffraction grating in order to produce a plurality of re-diffracted lights from the diffraction grating; and photoelectric converting means for photoelectrically converting interference light formed by causing the plurality of re-diffracted lights to interfere with each other in order to measure the displacement of the diffraction grating.

10. A measuring apparatus according to claim 9, wherein the angle of incidence $\theta m$ of the plurality of light beams onto the diffraction grating satisfies the following condition:

$$\theta m \approx \sin^{-1}(m\lambda/P),$$

where $\lambda$ is the wavelength of the light beams, P is the pitch of said diffraction grating, and m is an integer.

11. A method for projecting a light beam onto a diffraction grating, for forming interference light by the use of diffracted lights from the diffraction grating and for photoelectrically converting the interference light to thereby detect a displacement of the diffraction grating, comprising the steps of:

causing first and second light beams to obliquely enter substantially the same position on the diffraction grating from first and second directions which are different from each other;

causing first and second diffracted lights produced by the first and second light beams being diffracted by the diffraction grating to enter the diffraction grating so as to cause the first and second diffracted lights to travel along a common optical path; and photoelectrically converting an interference light formed by causing first and second re-diffracted lights produced by the first and second diffracted lights being diffracted by the diffraction grating to interfere with each other.

12. A method according to claim 11, wherein the step for entering the first and second diffracted lights includes the step of causing the first and second diffracted lights to substantially perpendicularly enter the diffraction grating.

13. A method according to claim 11, wherein the first and second re-diffracted lights are set to be a +1st-order diffracted light and a −1st-order diffracted light, respectively, and the first re-diffracted light is a +1st-order diffracted light produced by diffracting the first diffracted light and the second re-diffracted light is −1st-order diffracted light produced by diffracting the second diffracted light.

14. A method according to claim 13, wherein the first and second diffracted lights are ±first-order reflected diffracted lights which are reflected by the diffraction grating.

15. A method according to claim 13, wherein the step of obliquely entering the first and second light beams is performed so that the first and second diffracted lights substantially perpendicularly emerge from the diffraction grating.

16. A displacement detection device for detecting a displacement of a diffraction grating, comprising:

optical means for forming first and second optical paths which intersect on the diffraction grating;

a light source for supplying a light beam along the first and second optical paths so as to illuminate the diffraction grating;

means for directing first and second diffracted lights emerging from the diffraction grating to the diffraction grating via a common optical path for the first and second diffracted lights; and a photodetector for detecting an interference light formed by causing first and second re-diffracted lights produced by the first and second diffracted lights being diffracted by the diffraction grating to interfere with each other, and outputting a signal corresponding to the displacement of the diffraction grating.

17. A device according to claim 16, wherein the first and second diffracted lights are reflected diffracted lights which are reflected and diffracted by the diffraction grating.

18. A device according to claim 17, wherein the first diffracted light is +1st-order diffracted light and the second diffracted light is −1st-order diffracted light.

19. A device according to claim 16, wherein the first and second diffracted lights are transmitted diffracted lights transmitted through and diffracted by the diffraction grating.

20. A device according to claim 19, wherein the first diffracted light is +1st-order diffracted light and the second diffracted light is −1st-order diffracted light.

21. A device according to claim 20, wherein the first re-diffracted light is a +1st-order diffracted light produced by diffracting the first diffracted light, and the second re-diffracted light is −1st-order diffracted light produced by diffracting the second diffracted light.

22. A method for detecting a displacement of a diffraction grating comprising the steps of:

directing a radiation beam to the diffraction grating and producing first and second diffracted beams by the diffraction grating;

directing the first and second diffracted beams to the diffracting grating via a common beam path for the first and second diffracted beams and producing first and second re-diffracted beams; and detecting an interference beam formed by causing the first and second re-diffracted beams to interfere with each other.

23. A method according to claim 22, wherein said radiation beam directing step is performed so that the first and second diffracted beams emerge from the diffraction grating so as to be superposed on each other.

24. A method according to claim 23, wherein in said radiation beam directing step the first and second diffracted beams are produced by the radiation beam being reflected and diffracted by the diffraction grating.

25. A method according to claim 23, wherein said radiation beam directing step is performed so that the first and second diffracted beams are positive and negative same order diffracted beams.

26. A method according to claim 25, wherein said first and second diffracted beam directing step is performed so that the first and second re-diffracted beams are positive and negative same order diffracted bemas.

27. A method according to claim 22, wherein the first and second diffracted beams are a +1st-order diffracted beam and a −1st-order diffracted beam, respectively, and the first re-diffracted beam is a +1st-order diffracted beam produced by diffracting the first diffracted beam and the second re-diffracted beam is a −1st-order diffracted beam produced by diffracting the second diffracted beam.

28. A device for detecting a displacement of a diffraction grating comprising:

means for directing a radiation beam to the diffraction grating;

optical means for causing first and second diffracted beams produced by the diffraction grating to enter the diffraction grating via a common beam path for the first and second diffracted beams; and a detector for detecting an interference beam by causing first and second re-diffracted beams produced by the first and second diffracted beams being diffracted by the diffraction grating to interfere with each other and for converting the interference beam into a signal.

29. A device according to claim 28, wherein said optical means includes a reflecting mirror which reflects and directs the first and second diffracted beams to the diffraction grating.

30. A device according to claim 29, wherein the directing means directs the radiation beam so that the first and second diffracted beams emerge from the diffraction grating so as to be superimposed on each other.

31. A device according to claim 30, wherein said device is constructed so that the first and second diffracted beams are positive and negative same order diffracted beams and the first and second re-diffracted beams are positive and negative same order diffracted beams.

32. A device according to claim 28, wherein said directing means include a multimode semiconductor laser and wherein said directing means directs the radiation beam from said laser to the diffraction grating.

33. A device according to claim 28, wherein the first and second diffracted beams are a +1st-order diffracted beam and a −1st-order diffracted beam, respectively, and the first re-diffracted beam is a +1st-order diffracted beam produced by diffracting the first diffracted beam and the second re-diffracted beam is a −1st-order diffracted beam produced by diffracting the second diffracted beam.

34. A device for detecting a displacement of a diffraction grating comprising:

means for emitting first and second diffracted beams whose optical paths overlap each other from the diffraction grating by directing a radiation beam to the diffraction grating;

optical means for causing the first and second diffracted beams to enter the diffraction grating; and a detector for detecting an interference beam by causing first and second re-diffracted beams produced by the first and second diffracted beams being diffracted by the diffraction grating to interfere with each other and for converting the interference beam into a signal.

* * * * *

UNITED STATES PATENT AND TRADEMARK OFFICE
CERTIFICATE OF CORRECTION

PATENT NO. : 4,930,895
DATED : June 5, 1990
INVENTOR(S) : Tetsuharu Nishimura, et al.

It is certified that error appears in the above-identified patent and that said Letters Patent is hereby corrected as shown below:

COLUMN 7:

Line 36, "system for" (second occurrence) should be deleted.

Line 37, "reflecting" should be deleted.

COLUMN 10:

Line 37, "diffracting grating" should read --diffraction grating--.

Line 58, "diffracted bemas." should read --diffracted beams.

Signed and Sealed this

Twenty-first Day of July, 1992

Attest:

DOUGLAS B. COMER

Attesting Officer     Acting Commissioner of Patents and Trademarks